United States Patent [19]
Martin

[11] 3,811,273
[45] May 21, 1974

[54] SLAVED FUEL CONTROL FOR MULTI-ENGINED AIRCRAFT

[75] Inventor: Anthony N. Martin, Simsbury, Conn.

[73] Assignee: United Aircraft Corporation, East Hartford, Conn.

[22] Filed: Mar. 8, 1973

[21] Appl. No.: 339,479

[52] U.S. Cl................... 60/39.15, 60/39.28, 60/224
[51] Int. Cl.......... F02c 7/02, F02g 3/00, F02c 9/04
[58] Field of Search .......... 60/224, 223, 243, 39.15, 60/39.28 R, 39.28 P, 97 P, 97 R, 39.09 R

[56] References Cited
UNITED STATES PATENTS

| | | | |
|---|---|---|---|
| 3,299,630 | 1/1967 | Alper.................................. | 60/39.15 |
| 2,768,504 | 10/1956 | Wente et al..................... | 60/39.28 R |
| 3,174,284 | 3/1965 | McCarthy........................ | 60/39.28 R |
| 3,403,507 | 10/1968 | Schuster......................... | 60/39.28 R |

Primary Examiner—William L. Freeh
Assistant Examiner—Robert E. Garrett
Attorney, Agent, or Firm—Donald F. Bradley

[57] ABSTRACT

When a failure occurs in a fuel control for a turbine engine in a multi-engine aircraft, the fuel metering valve for the engine with the failed fuel control is connected to operate in a slaved mode in response to the control signal produced by the prime fuel control of one of the other aircraft engines. For slaved mode operation, the control signal produced by the prime fuel control is slightly attenuated and lag compensation is applied thereto before the control signal is fed to the fuel metering valve of the slaved engine in order to compensate for variations in engine characteristics and to provide additional safety margin.

8 Claims, 1 Drawing Figure

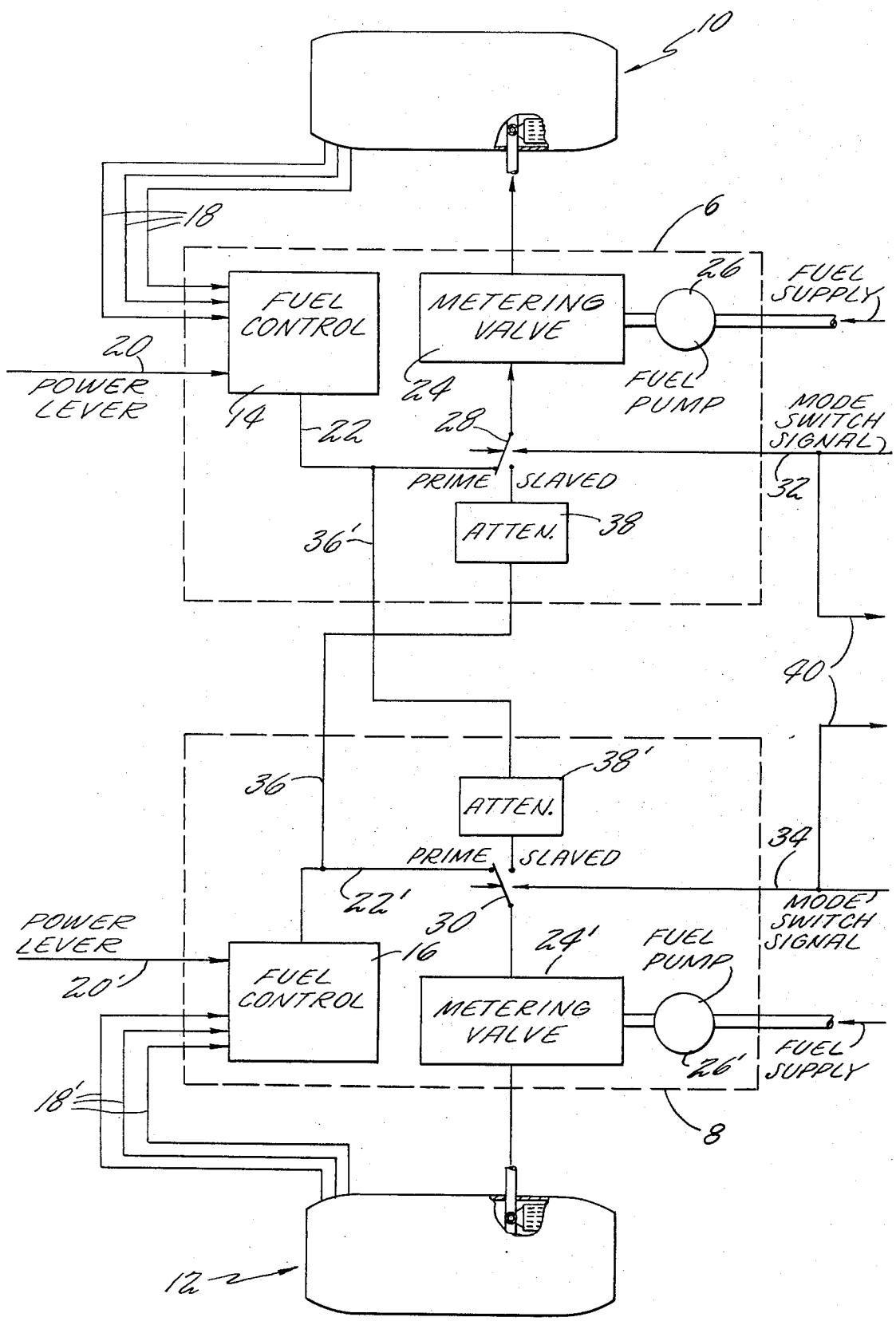

SLAVED FUEL CONTROL FOR MULTI-ENGINED AIRCRAFT

BACKGROUND OF THE INVENTION

1. Field of the Invention

This invention relates to fuel controls for turbine engines, particularly for use in multi-engine aircraft, and specifically to a secondary fuel control mode which will permit a turbine engine to continue in operation, although at a slightly reduced power setting and with a slower response time, when a malfunction occurs in the prime fuel control for the engine.

2. Description of the Prior Art

The safe operation of an aircraft gas turbine engine is dependent upon the correct functioning of the fuel control system which meters the fuel supplied to the engine in accordance with the power demands made by the flight crew, the various engine parameters such as speeds, temperatures and pressures, and the ambient and flight conditions at which the aircraft is operating. At present, if the fuel control system fails, it is necessary that the engine be shut down and the remaining engines be used to sustain flight. Operation with less than all its engines by an aircraft is necessarily less safe and aerodynamically less efficient than if all engines remained in operation, even though one or more engines were to be operated at a reduced power level.

Many schemes are available which provide a secondary or backup control system to replace the prime fuel control system in the event of a fuel control failure. Such schemes, however, require a redundant fuel control unit which has the disadvantage of causing a considerable increase in system size, weight and cost which generally outweighs the potential advantages. The disadvantages are due in large measure to the need to reproduce within the redundant or secondary system all the input signal conditioning devices and control logic which exist in the prime fuel control system.

The present invention describes a secondary or backup fuel control system or mode which may be used in place of a failed prime system, and which does not cause large increases in system size, weight and cost. The invention is applicable to both civil and military multi-engined aircraft, and enables an engine with a failed fuel control to continue to supply power which, though slightly less than the maximum normally available, is sufficient to enable sustained flight in a safe and efficient mode of operation.

The present invention makes use of the fact that during normal operations, all the engines of a multi-engined aircraft receive a similar power demand from the flight crew as a function of power lever angle (throttle), operate under essentially identical ambient and flight conditions, and are all of the same type and operate within the same specified performance limits.

SUMMARY OF THE INVENTION

The "fail slaved" fuel control system described herein provides for normal operation of each engine by a conventional prime fuel control system operating a standard fuel metering valve. In the event, however, of a failure of a prime fuel control unit, the fuel metering valve is operated in a secondary, or slaved, mode by the properly functioning prime fuel control system of another (master) engine of the aircraft. The fuel metering valve setting in the slaved mode of operation in both steady-state and transient operating conditions is preferably some slight percentage less than that of the prime system, for example, 5 percent less than that of the master engine, to provide for permissible variations in engine characteristics and to provide an additional safety margin for the slaved engine. Dependent upon the desired operational characteristics in the slaved mode, a lag time constant may also be incorporated to provide a slower acting fuel metering valve. Lagged operation would provide an increased surge margin during accelerations, and a lesser possibility of flameout during decelerations. Ideally the flight crew would be alerted by appropriate warning indications that an engine was running in a slaved mode, and that the engine would therefore have a slower response to power demand changes which would be signalled by the master engine power lever. Normal engine parameter indications of power, speed, temperature, pressure, etc. would continue to be monitored by the flight crew as during normal operation of the engine.

BRIEF DESCRIPTION OF THE DRAWING

The single FIGURE shows schematically and partially in block diagram form a fail slaved fuel control for a twin engined aircraft.

DESCRIPTION OF THE PREFERRED EMBODIMENT

Referring specifically to the FIGURE, there is shown the basic components of a fail slaved fuel control for a two engine aircraft. The same concepts may be applied to an aircraft containing any number of engines as will be apparent to those skilled in the art.

Each of the engines, 10 and 12, has associated therewith a fuel control system 6 and 8, each of which includes a fuel control unit 14 and 16 respectively. Any type of conventional fuel control unit is contemplated by the present invention, whether electronic, hydromechanical or other type, as long as the output therefrom is in the form of a signal which is fed to a fuel metering valve.

Fuel control unit 14 receives from engine 10 through signal lines 18 engine input signals such as temperature or speed required for normal operation of the fuel control, and also receives through signal line 20 a throttle or power lever signal indicative of desired engine operation. Additional signals may be fed into the fuel control as required.

The output signal from fuel control unit 14 is typically a valve position command which is fed via line 22 to a metering valve 24 through which fuel is supplied from the fuel tanks by means of a fuel pump 26 to the engine 12 as determined by the position of the metering valve in accordance with the output or control signal from the fuel control unit 14.

Fuel control unit 16 is similarly connected with engine 12 to receive therefrom engine input signals via lines 18' and a power lever signal via line 20'. The output from the fuel control unit 16 is connected to metering valve 24' via line 22' to adjust the position of the metering valve and control the flow of fuel from the fuel supply through pump 26' into the engine 12 as scheduled by the fuel control unit 16.

Presently, failure of a fuel control unit such as 14 or 16 requires that the associated engine be shut down. By means of the present invention, a failed fuel control is operated in a secondary or slaved mode by the correctly functioning prime fuel control of the other or master engine.

To operate the fuel controls in a slaved mode, a mode control switch 28 is connected in line 22 between fuel control unit 14 and metering valve 24, and a second mode control switch 30 is connected in signal line 22' between fuel control unit 16 and metering valve 24'. During normal operation, that is, when no failure of a fuel control has occurred, mode control switches 28 and 30 remain in their prime position and each fuel control unit is directly connected to its respective metering valve. However, in the event of a failure, either of the mode control switches 28 or 30 may be moved to its slaved position by means of a mode switch signal through lines 32 or 34. The mode switch signal may be instituted manually by the flight crew, or may be generated automatically in response to failure sensing equipment.

If fuel control unit 14 connected with engine 10 fails, a signal will be sent via line 32 and mode control switch 28 will be disconnected from its prime terminal and connected to the slaved terminal. With the switch 28 in this position, the control signal from fuel control unit 16 is fed through signal line 22', line 36, and through a slave mode attenuator 38 and mode control switch 28 to metering valve 24. The movement of switch 28 to its slaved position removes the fuel control unit 14 from further operation. The control signal from fuel control 16 is fed through switch 30 which remains in its prime position to regulate the position of metering valve 24 and control engine 12, and is also fed through switch 28 in its slaved position to control the fuel metering valve 24 and engine 10.

The signal attenuator 38 is provided in the slaved or secondary signal path to reduce the gain of the fuel control signal as applied to the slaved engine. A typical attenuation value is 0.95, that is, the slaved metering valve 24 and engine 10 will respond to fuel control unit 16 at only 95 percent of the setting of fuel control 16 in order to compensate for normal variations between engines. The attenuation may obviously be varied depending on the circumstances and the history of the particular type of engine. If no attentuation is provided, and if the full output from the prime fuel control unit is fed to the slaved engine, instances of engine operation above its rated or desired valve may occur due to the small but acceptable performance variations between individual engines.

A lag transfer function on the order of $1/\tau S + 1$ may also be designed into the attenuator 38 to provide a time delay to the control signal in response to a change in the operation scheduled by fuel control unit 16. Again because of differences in engine operation, the lag may be desirable to prevent surge or flameout of the slaved engine due to the small but acceptable differences in transient characteristics of individual engines Actuation of either of the mode control switches 28 or 30 may be indicated to the flight crew by means of a signal fed via lines 40.

If a malfunction occurs in fuel control unit 16, a signal will be fed via line 34 to move mode control switch 30 from its prime to its slaved position. Fuel control unit 16 would thus be disconnected, and metering valve 24' would receive command signals from fuel control 14 via line 22, line 36', attenuator 38' and mode control switch 30.

The present invention thereby enables an engine with a failed fuel control unit to continue in operation and provides a fail-safe characteristic without substantial increase in system complexity, size and weight as would be required by fully redundant fuel controls.

It is apparent that modifications may be made to the present invention for engine installations of more than two engines. Likewise, the invention need not be limited to turbine engines or to aircraft, but is equally applicable to stationary power stations. The invention could also be used on more complex engines to provide back up control of variable geometry devices such as variable exhaust nozzles and compressor bleeds.

I claim:

1. In an apparatus powered by a plurality of engines, each of said engines having associated therewith a fuel control unit producing a control signal for scheduling the flow of fuel to said engine, the improvement comprising switch means operable upon a malfunction in the fuel control unit of one of said engines for disabling the control signal therefrom, and means connected with said switch means for simultaneously connecting to said one engine the control signal from one of said other engine fuel control units.

2. Apparatus as in claim 1 and including attenuator means connected in series with the control signal from said other fuel control unit for attenuating the said other control signal.

3. Apparatus as in claim 2 in which said attenuator means includes means for applying compensation to said other control signal.

4. Apparatus as in claim 3 in which said means for applying compensation includes a lag circuit.

5. Apparatus as in claim 1 in which said engines are gas turbine engines in a multi-engine aircraft.

6. A fuel control system comprising a first engine to which fuel is supplied through a metering valve, a first fuel control unit producing a first control signal for scheduling the position of said metering valve, a second engine having associated therewith a second fuel control unit producing a second control signal for scheduling the flow of fuel to said second engine, and switch means connected between said first fuel control unit and said fuel metering valve for disconnecting said first control signal from said fuel metering valve and connecting said fuel metering valve to receive said second control signal.

7. Apparatus as in claim 6 and including attenuator means connected between said switch means and said second fuel control unit for attenuating said second control signal.

8. Apparatus as in claim 7 in which said attenuator means includes means for applying compensation to said second control signal.

* * * * *